United States Patent [19]
Krekow

[11] 3,739,179
[45] June 12, 1973

[54] RADIATION SENSITIVE TRAFFIC WARNING SYSTEM

[76] Inventor: Iniz I. Krekow, 1060 Concord Street, San Diego, Calif.

[22] Filed: Jan. 7, 1971

[21] Appl. No.: 104,570

[52] U.S. Cl. ................. 250/216, 250/202, 350/97, 94/1.5
[51] Int. Cl. .......................................... E01c 23/16
[58] Field of Search ................. 250/221, 222, 216, 250/202, 234, 214 D; 94/1.5; 340/52; 180/79.1; 350/293, 299, 97

[56] References Cited
UNITED STATES PATENTS

| | | | |
|---|---|---|---|
| 2,896,089 | 7/1959 | Wesch | 250/214 D X |
| 2,074,251 | 3/1937 | Braun | 180/79.1 |
| 2,331,144 | 10/1943 | Sitter | 250/202 X |
| 1,695,410 | 12/1928 | Baseler | 250/216 X |
| 3,179,009 | 4/1965 | Sheffield et al. | 94/1.5 |

*Primary Examiner*—Walter Stolwein
*Attorney*—Richard K. MacNeill

[57] ABSTRACT

A traffic warning system for warning vehicles in the event of an attempt to enter a traffic lane in the wrong direction or crossing over a center line which will emit a loud signal as from the vehicle horn in which a reflective surface disposed on the center line and as seen by a vehicle crossing the center line and on any lane as seen by a vehicle attempting to proceed in the wrong direction in that lane which will reflect a collimated light projected by the vehicle and returned thereto through a discriminator which is coupled to the vehicle horn and a similar warning system which alerts vehicles as they are changing lanes proceeding in the correct direction whereby a reflective surface reflects the same collimated light in a different duty cycle which is passed through the discriminator sounding a soft alarm, such as a bell.

1 Claim, 4 Drawing Figures

INVENTOR.
INIZ I. KREKOW

BY

Richard K. Macneill

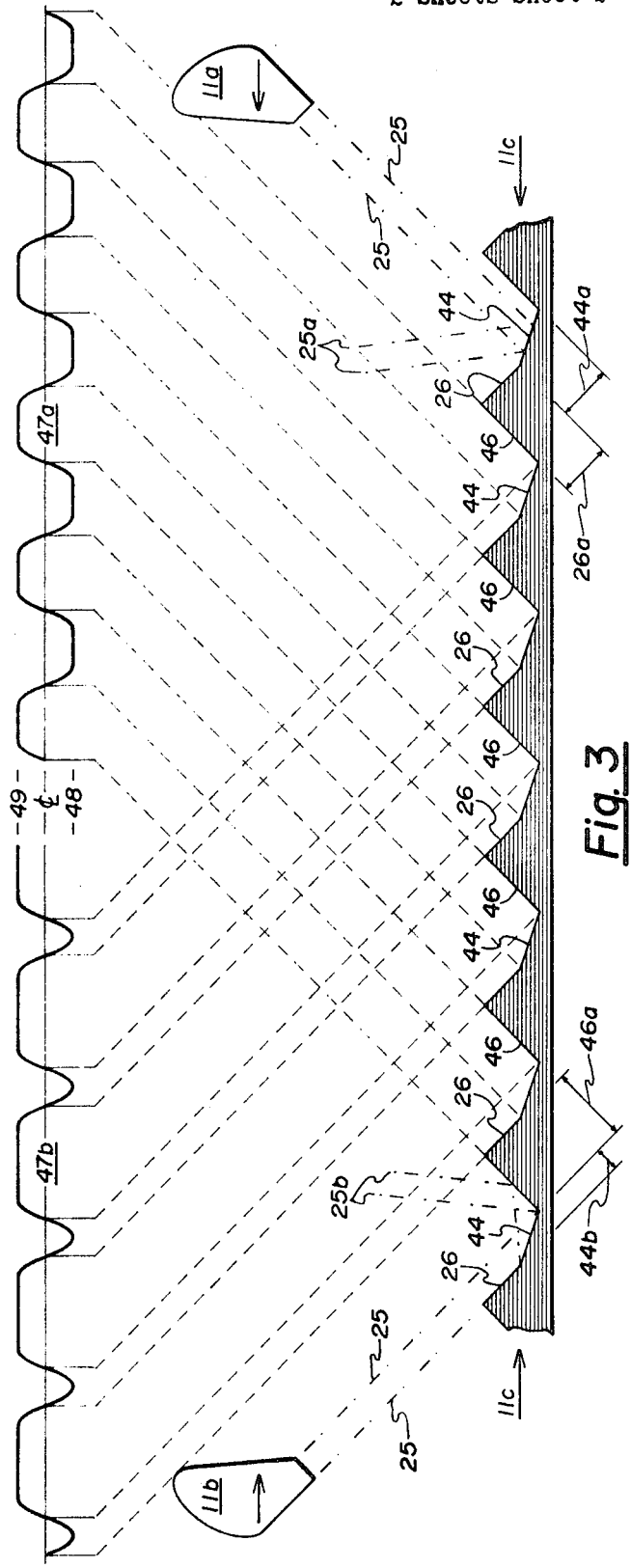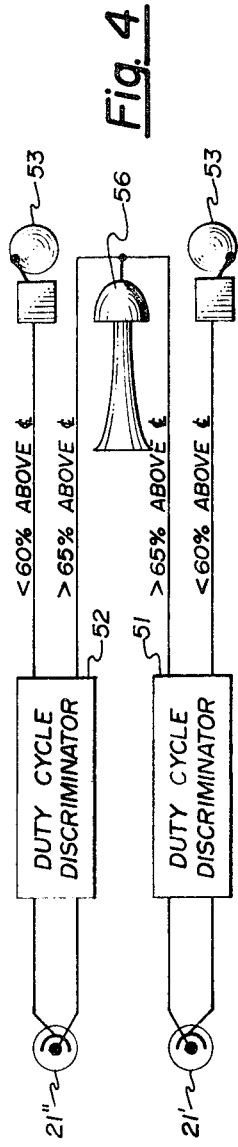
INVENTOR.
INIZ I. KREKOW
BY
Richard K. Macneill 3,739,179

RADIATION SENSITIVE TRAFFIC WARNING SYSTEM

BRIEF DESCRIPTION OF THE INVENTION

The present invention relates to a traffic warning system and more particularly to a traffic warning system yielding a loud signal when a vehicle is attempting to proceed in the wrong direction and a signal of less intensity when the vehicle is changing lanes.

According to the invention, a traffic warning system is provided whereby a collimated light source is attached to a vehicle which projects a collimated light toward the surface on which the vehicle is traveling. A plurality of reflectors is spaced along the surface on which the vehicle is traveling for reflecting light therefrom to impinge upon a sensor mounted on the vehicle. The output of the sensor is then suitably processed for application to an indicia. In the preferred embodiment, two indicias are provided, one being the result of the vehicle's attempt to proceed in the wrong direction, such as crossing the center line or attempting an entrance on an "Off" exit from a freeway and another signal indicating the vehicle is passing over a lane divider. Any suitable signal can be utilized, such as the vehicle's horn or an external bell, etc. While the disclosure is related to a reflected light beam, any suitable signal source such as heat, i.e., infrared or microwave, etc., may be utilized.

An object of the present invention is the provision of a traffic warning system for signalling a vehicle's travel in the wrong direction.

Another object of the present invention is the provision of a traffic warning system for signalling a lane changing vehicle.

A still further object of the invention is the provision of a traffic warning system which is inexpensive to manufacture and extremely simple to install.

Other objects and many of the attendant advantages of this invention will be readily appreciated as the same becomes better understood by reference to the following detailed description when considered in connection with the accompanying drawings in which like reference numerals designate like parts throughout the FIGS thereof and wherein:

FIG. 3 is a diagram illustrating an asymmetrical reflective surface and the signals resulting therefrom; and FIG. 4 is a block diagram of the electrical installation on a vehicle.

DETAILED DESCRIPTION OF THE DRAWINGS

Figure 1:
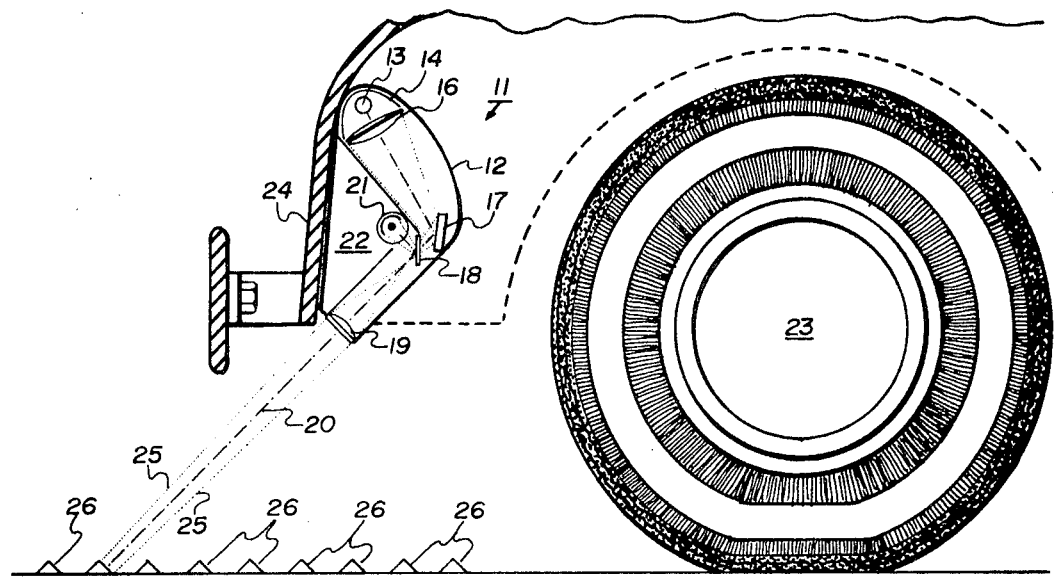
FIG. 1 is a simplified schematic representation of a preferred embodiment of the present invention.

Referring to FIG. 1, a physical placement of a light source and collimator is shown generally at 11. A waterproof and dustproof case 12 houses a light source 13 with a reflector 14. Light from light source 13 passes through a condenser lens 16 and impinges upon mirror 17 which reflects the light beam through a pellicle mirror 18. Pellicle mirror 18 transmits a majority of light through an outer optical lens 19 located concentrically on an optical axis 20. A sensor 21' is disposed adjacent an area 22 in which the electronic components can be mounted. A left front wheel 23 of a vehicle is shown under and beneath a left front fender 24 beneath which waterproof and dustproof case 12 is mounted. Light rays of the lighting and sensing system are shown being reflected back by one of a multiplicity of reflecting surfaces 26 which are mounted in a roadway level.

Figure 2:
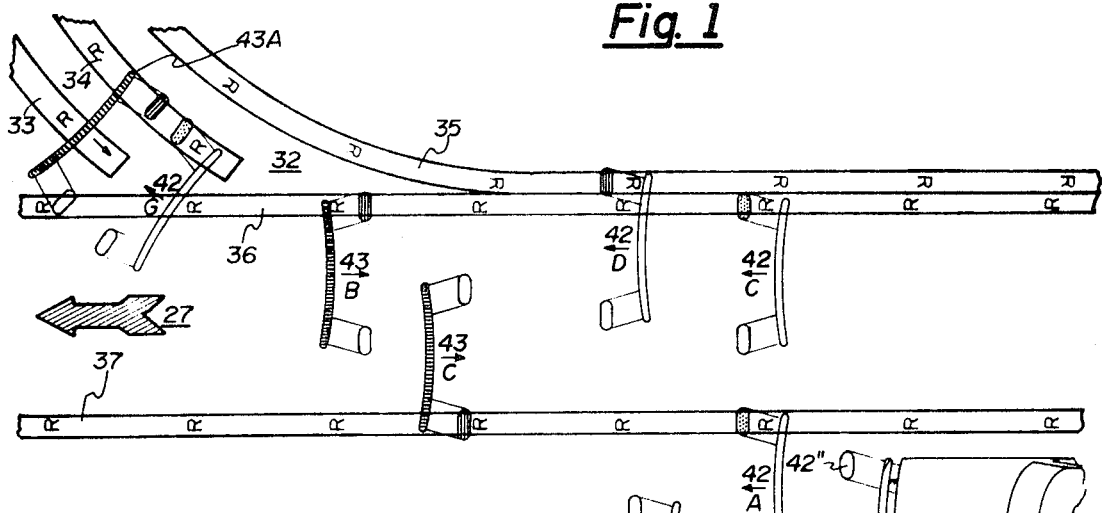
FIG. 2 is a schematic representation of a typical highway installation with a plurality of vehicles thereon.
Figure 2:
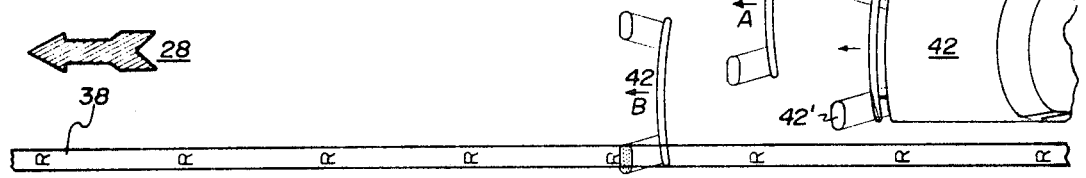
Figure 2:
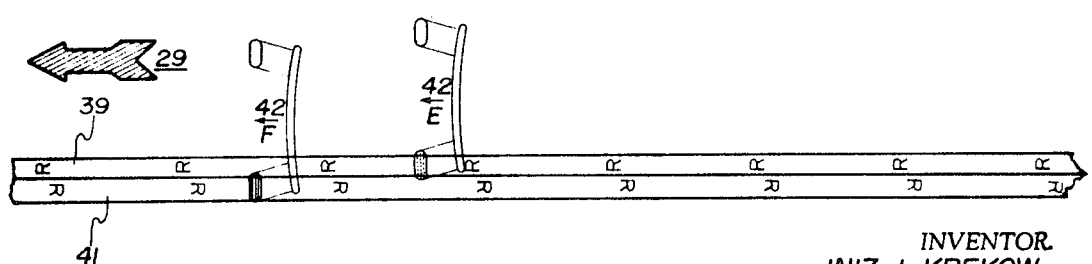

Referring to FIG. 2, a plan view of approximately half of a six-lane freeway is shown having lanes 27, 28 and 29 with an arrow showing the direction of vehicle travel. Lane 31 is shown with an opposite arrow indicating traffic in the opposite direction. "Off" ramp 32 has an "Off" ramp inner marking strip 33 and outer marking strip 34. Outer marking strip 36, outer lane divider strip 37, inner lane divider strip 38 and left-bound center divider strip 39 are indicated along with a right-bound center divider 41. Each of the strips has a plurality of the letter "R" indicating reflecting surfaces imbedded therein. Two of the strips, edge strip 35 and right-bound center divider 41, have a reversed orientation of the reflecting surfaces as indicated by the reverse direction of the letters "R". A vehicle 42 is shown in lane 28 proceeding in the correct direction with left and right sensors 42' and 42''. A plurality of vehicles is indicated by bumpers and pairs of sensors in various positions on the roadway. These are referenced 42A, 42B, 42C, 42D, 42E, 42F and 42G. These vehicles are indicated traveling in the correct direction by arrows adjacent thereto. Vehicles 43A, 43B and 43C are indicated as traveling in the wrong direction by their adjacent arrows.

Referring to FIG. 3, an asymmetrical reflector strip is shown at 11C having reflective surfaces 26 and 46 and deflective surfaces 44. Signals resulting from the reflection and deflection from light sources indicated at 11A and 11B (going in the opposite direction as indicated by the associated arrows) are shown by waveforms 47A and 47B having a below center line level of 48 and an above center line level of 49 and a center line indicated as such. Light beam 25 generated by source 11A is shown deflected at 25A from deflecting surface 44 and reflected at surface 26. The deflecting period is shown at 44A and the reflecting period is shown at 26A. Light from light source 11B is shown at beam 25 impinging upon deflecting surface 44 and reflecting surface 46. The period of reflection from reflecting surface 46 is shown at 46A and the period of deflection from deflecting surface 44 is shown at 44B.

Referring now to FIG. 4, sensor 21' is coupled to duty cycle discriminator 51. Duty cycle discriminator 51 has one output indicated at greater than 65 percent above the center line coupled to horn 56 and another output indicated as less than 60 percent above center line coupled to bell 53. Sensor 21'' is coupled to duty cycle discriminator 52. Duty cycle discriminator 52 has one output indicated at less than 60 percent above center line coupled to bell 53 and another output indicated as greater than 65 percent above center line coupled to horn 56.

OPERATION

Referring now to all of the drawings, it can be seen that a vehicle 42 (FIG. 2) proceeding along a lane such as that shown at 28 and being properly positioned between the lane dividing lines 37 and 38, will not receive a reflective beam from any of the reflectors due to the geometry of the system. However, should the vehicle stray over one of the lane divider lines indicated at 42A or 42B, a reflection will occur such as that shown in FIG. 3 at 47A from light source 11A. This type of reflection would result in a substantially symmetrical signal which would have a duty cycle of less than 60 percent above the center line. This would result in an output from duty cycle discriminator 51 or 52 to bell 53 indicating a lane change was in progress.

If, however, a vehicle attempts to proceed in the wrong direction, such as that indicated at 43A, 43B, 43C or 42F (over the center divider line 41), the light reflection would be that indicated at FIG. 3 from light source 11B. This would result due to the asymmetry of the reflective strip 11C, in an asymmetrical signal such as that indicated at 47B. Since the portion of the signal above the center line is greater than 65 percent, an output would be seen from duty cycle discriminator 51 or 52 to horn 56 indicating a wrong-way travel of the vehicle.

Referring now back to FIG. 2, it can be seen that vehicle 42A would sound a bell 53, as would vehicle 42B. Vehicle 42C and 42G would, likewise, receive a reflection of less than 60 percent duty cycle resulting in an output to bell 53. Vehicle 42E, as it passes center divider line 39, would first receive a bell warning and then due to a reversal of the reflectors, receive a horn warning which is indicated at vehicle 42F. The horn warning will also be sounded due to a reverse impingement upon the reflectors of vehicles 43A, 43B and 43C.

While a light ray system has been described, it should be understood that an infrared or microwave system would be equally effective. The only required change would be in the sources and transducers. Also, it is obvious that other indicia or outputs can be taken from the discriminators other than the vehicle horn and bell.

It should be understood of course that the foregoing disclosure relates to only a preferred embodiment of the invention and that it is intended to cover all changes and modifications of the example of the invention herein chosen for the purposes of the disclosure which do not constitute departures from the spirit and scope of the invention.

The invention claimed is:

1. A traffic warning system for warning vehicles traveling in the wrong direction comprising:

a collimated light source attached to said vehicle and positioned for impingement of light upon the surface over which the vehicle is traveling;

a plurality of reflectors disposed on said surface, said reflectors each having a geometry for reflecting said impinging light back toward said vehicle when said vehicle is traveling in the wrong direction;

said plurality of reflectors each comprising first and second reflecting surfaces and a deflecting surface, said first and second reflecting surfaces and deflecting surface having an asymmetrical geometry for varying the duty cycle of the reflected light dependent upon the direction of light impingement thereon;

sensing means located on said vehicle for sensing the reflections of said impinging light; and indicating means coupled to said sensing means.

* * * * *